United States Patent [19]

Nogami et al.

[11] 4,198,824
[45] Apr. 22, 1980

[54] SEALED FLUID RESERVOIR FOR BRAKE MASTER CYLINDERS

[75] Inventors: Tomoyuki Nogami; Takashi Fujii, both of Toyota, Japan

[73] Assignees: Toyota Jidosha Kogyo Kabushiki Kaisha, Toyota; Aishin Seiki Kabushiki Kaisha, Kariya, both of Japan

[21] Appl. No.: 881,139

[22] Filed: Feb. 24, 1978

[30] Foreign Application Priority Data

Mar. 8, 1977 [JP] Japan .............................. 52-28469[U]

[51] Int. Cl.² .............................................. F15B 7/00
[52] U.S. Cl. ........................................ 60/535; 60/545; 60/592; 220/208; 220/209
[58] Field of Search ................. 60/534, 535, 545, 585, 60/592; 220/208, 209; 137/102, 512.4

[56] References Cited

U.S. PATENT DOCUMENTS

| | | |
|---|---|---|
| 3,423,939 | 1/1969 | Lewis . |
| 3,454,183 | 7/1969 | Fuchs . |
| 4,136,712 | 1/1979 | Nogami ................. 220/209 |

FOREIGN PATENT DOCUMENTS

| | | |
|---|---|---|
| 7224951 | 10/1972 | Fed. Rep. of Germany . |
| 2502746 | 8/1975 | Fed. Rep. of Germany ............. 60/535 |
| 2429704 | 1/1976 | Fed. Rep. of Germany . |
| 2555867 | 7/1976 | Fed. Rep. of Germany . |
| 2636607 | 2/1977 | Fed. Rep. of Germany ............. 60/534 |
| 1185309 | 3/1970 | United Kingdom . |

*Primary Examiner*—Abraham Hershkovitz
*Attorney, Agent, or Firm*—Stevens, Davis, Miller & Mosher

[57] ABSTRACT

A resilient seal cap is coupled over an upper opening of a reservoir casing to define an interior air space with the upper surface of brake fluid in the casing. The seal cap is formed integral with a first annular lip co-operating with the inner wall of the casing to provide an inlet check valve permitting the flow of air into the interior air space and with a second annular lip co-operating with a valve plate secured to the center of the casing to provide an outlet check valve permitting the flow of air out from the interior air space to the exterior.

6 Claims, 1 Drawing Figure

U.S. Patent
Apr. 22, 1980
4,198,824
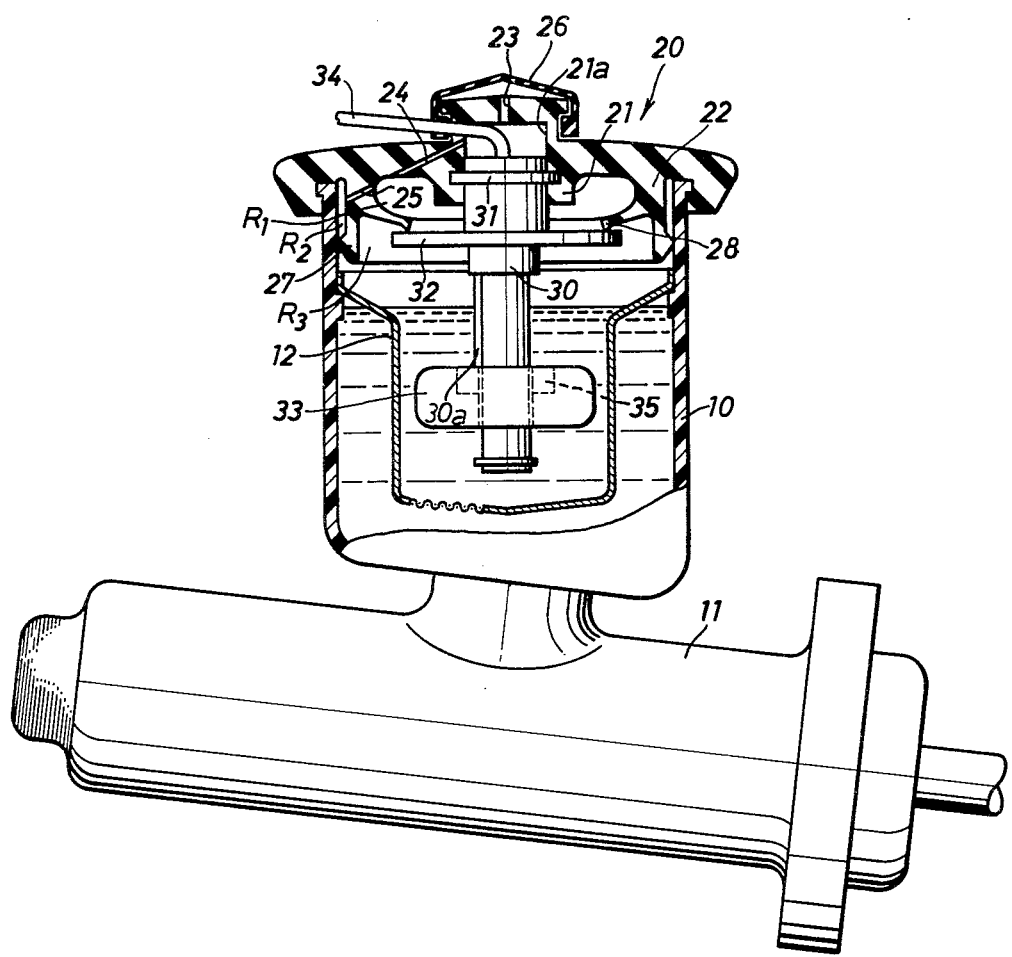

SEALED FLUID RESERVOIR FOR BRAKE MASTER CYLINDERS

BACKGROUND OF THE INVENTION

The present invention relates to a fluid reservoir for a brake master cylinder, and more particularly to an improvement of a sealed fluid reservoir in which brake fluid can be sealed against the surrounding air regardless of an increase or decrease of the brake fluid.

SUMMARY OF THE INVENTION

The primary object of the present invention is to provide a sealed fluid reservoir in which a seal cap coupled with the upper opening of a casing is formed at the inner wall thereof with a first annular lip cooperable with the inner wall of the casing to permit only flow of the air sucked into a sealed compartment formed above the surface of the brake fluid and a second annular lip cooperable with a valve plate secured to the central inner wall of the cap to permit only flow of the air exhausted from the sealed compartment.

Another object of the present invention is to provide a sealed fluid reservoir in which the first annular lip of the cap serves to scrape down the brake fluid adhered to the inner wall of the casing when the cap is coupled with the casing after supply of brake fluid.

BRIEF DESCRIPTION OF THE DRAWINGS

The above-mentioned and further objects and features of the present invention will become clear from the following description with reference to the accompanying drawing, which shows an elevational view partially in section covering a master cylinder with a sealed fluid reservoir in accordance with the present invention.

DESCRIPTION OF THE PREFERRED EMBODIMENT

Referring now to the drawing, a reservoir casing 10 is fixedly mounted on a brake master cylinder 11 to store brake fluid therein as a supply for the master cylinder and provided therein with an oil strainer 12. A main cap 20 is made of synthetic rubber and air-tightly coupled with the upper opening of the casing 10 to close the interior of the casing 10. The main cap 20 is formed at the inner wall thereof with a central annular boss 21 and an annular protrusion 22 which are extended downwardly in the casing 10. The annular protrusion 22 is separated at its outer periphery from the inner wall surface of the casing 10 with a predetermined clearance. A vent hole 23 is provided at the head of the cap 20 to communicate an inner bore 21a of the boss 21 to the atmospheric air and two passages 24 and 25 are provided at the respective bases of the boss 21 and protrusion 22 to communicate the inner bore 21a to the interior of the casing 10. A metallic sub-cap 26 is loosely coupled with the head of the main cap 20 to cover the vent hole 23.

Within the interior of the casing 10, a magnetically operable switch means comprises a rod element 30 having an upper flange 31 secured to the annular boss 21 and extends downward through a float member 33. The rod element 30 is provided therein with a normally open reed switch and a resistor (not shown) which are connected to an electric alarming circuit by way of a lead wire 34 to issue an alarm at a dangerous decrease in the quantity of the brake fluid. The rod element 30 is provided at its neck with a circular valve plate 32 and at one side thereof with a stopper rib 30a to restrict upward movement of the float member 33 such that the float member 33 is moved up and down at a lower extent of the rod element 30 in accordance with variation of the level of brake fluid. The float member 33 has a ring shaped permanent magnet 35 cooperable with the reed switch.

This embodiment is characterized in that the protrusion 22 of the main cap 20 is formed with a first annular lip 27 engageable with the inner wall of the casing 10 and a second annular lip 28 engageable with the upper face of the valve plate 32. The first lip 27 is arranged to cooperate with the inner surface of the casing 10 thereby to provide a first check valve to permit only flow of the air from up to down. The second lip 28 is arranged to cooperate with the upper face of the valve plate 32 thereby to provide a second check valve to permit only flow of the air from down to up. Thus, the interior of the casing 10 above the surface of brake fluid is subdivided into three compartments, namely an upper compartment $R_1$ in communication with the atmospheric air through the passage 24 and the vent hole 23, an annular compartment $R_2$ in communication with the upper compartment $R_1$ through the passage 25, and a lower compartment $R_3$ air-tightly closed by the first and second lips 27 and 28.

In use of the sealed fluid reservoir having the above-mentioned construction, when the surface of brake fluid is maintained in a predetermined level, the first and second lips 27 and 28 are resiliently engaged with the inner wall of the casing 10 and the upper face of the valve plate 32 so that the lower compartment $R_3$ is air-tightly sealed to prevent entrance of water or moisture into the brake fluid.

When the level of brake fluid is rapidly raised due to inflation of the brake fluid caused by rise of the ambient temperature, the air in the lower compartment $R_3$ is compressed. Then, the second annular lip 28 is flexed upwardly to permit flow of the compressed air toward the upper compartment $R_1$. This decreases the pressure in the lower compartment $R_3$ down to the atmospheric pressure level. Thereafter, the second lip 28 will engage the upper face of the valve plate 32 to instantly close the lower compartment $R_3$. In this instance, the first annular lip 27 is maintained in the closed position thereof.

When the level of brake fluid drops due to shrinkage of the brake fluid caused by fall of the ambient temperature or decrease of the brake fluid caused by abrasion of the brake linings, the lower compartment $R_3$ becomes negative in pressure to flex the first annular lip 27 inwardly by a difference in pressure between the annular compartment $R_2$ and the lower compartment $R_3$. This permits flow of the atmospheric air into the lower compartment $R_3$ so that the pressure in the lower compartment $R_3$ increases up to the atmospheric pressure level. Thereafter, the first annular lip 27 will engage the inner wall of the casing 10 to instantly close the lower compartment $R_3$. In this instance, the second annular lip 28 is maintained in the closed position thereof.

In case the level of brake fluid drops below a minimum fluid level by leakage of the brake fluid, the reed switch in the rod element 30 is closed by magnetic force of the permanent magnet 35 of the float 33 to activate the electric alarming circuit so as to alarm shortage of the brake fluid to the operator. In such an occasion, the operator will remove the main cap 20 from the casing 10 to supply an amount of brake fluid. At the time of removing the cap 20, the first annular lip 27 continues to slide against the inner wall of the casing 10 so that the brake fluid on the inner surface of the lip 27 will not stick to any other place than the inner wall of the casing 10. Meanwhile, at the time of closing the cap 20 after supply of the brake fluid, the first annular lip 27 serves to scrape down the brake fluid adhered to the inner wall of the casing 10 so that there is no chance of brake fluid sticking outside of the casing 10 or flowing out.

Although the present invention has been illustrated and described in connection with a specific embodiment, various adoption and modifications will become apparent to those skilled in the art from the description in conjunction with the appended claims without departing from the scope and spirit of the present invention.

What is claimed is:

1. A fluid reservoir for mounting on a brake master cylinder, said reservoir comprising:

a casing for storing brake fluid, said casing having an inner wall and an upper opening;

a removable seal cap detachably coupled over the upper opening of said casing to air-tightly seal the interior of said casing, said seal cap defining an interior air space with the upper surface of brake fluid in said casing, said cap having a vent hole in the upper end thereof and a central annular boss forming an inner bore opening to the vent hole;

an annular substantially horizontally disposed valve plate secured to, below and concentrically disposed relative to the boss;

said cap further comprising a downwardly extending annular protrusion integral therewith, said protrusion comprising a first downwardly and inwardly extending annular lip the lower end of which abuts the upper side of said valve plate to define the interior air space below the first lip and an upper air space above the first lip and the upper side of said valve plate, said protrusion further comprising, radially outwardly of the first lip, a second downwardly extending lip the lower end of which abuts the inner wall of the casing, a portion of said annular protrusion above the lower end of said second lip being spaced from the inner wall of the casing to define an annular air space between the inner wall and said spaced portion; and means defined in said seal cap for continuously fluidly communicating the inner bore with the upper air space and the annular air space.

2. A fluid reservoir as claimed in claim 1, wherein a rod element is secured at its upper end to said annular boss and extends into the brake fluid in said casing, said valve plate being secured to a portion of said rod element.

3. A fluid reservoir as claimed in claim 2, wherein said vent hole is provided at the center of said cap to connect the interior of said annular boss to the atmospheric air.

4. A fluid reservoir as claimed in claim 2, wherein a float is arranged in said casing for up and down movements in response to variation of the level of brake fluid and said rod element is provided at one side thereof with a stopper rib to restrict upward movement of said float at a lower extent of said rod element.

5. A fluid reservoir as claimed in claim 4, further comprising switch means which comprises a permanent magnet secured to said float and a magnetically operable switch assembled within said rod element to be closed by magnetic force of said magnet such that a warning signal is issued when said float moves down to a lower warning position dependent on a minimum fluid level in said casing.

6. A fluid reservoir as claimed in claim 1, wherein:

said means comprises a first air passage directly fluidly communicating the inner bore and the upper air space and a second air passage in the annular protrusion directly fluidly communicating the upper air space and the annular air space.

* * * * *